(12) United States Patent
Hidaka et al.

(10) Patent No.: US 6,388,424 B1
(45) Date of Patent: May 14, 2002

(54) CELL SHUNT CIRCUIT FOR BATTERY CELLS

(75) Inventors: Takayuki Hidaka; Toshio Okamura, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/901,675

(22) Filed: Jul. 11, 2001

(30) Foreign Application Priority Data

Dec. 14, 2000 (JP) ..................... 2000-380504

(51) Int. Cl.⁷ .................. H02J 7/14
(52) U.S. Cl. .................. 320/122
(58) Field of Search .............. 320/120, 121, 320/122, 116, 124

(56) References Cited

U.S. PATENT DOCUMENTS

| | | | | |
|---|---|---|---|---|
| 4,238,721 A | * | 12/1980 | DeLuca et al. | 320/122 |
| 4,713,597 A | * | 12/1987 | Altmejd | 320/122 |
| 6,297,616 B1 | * | 10/2001 | Kubo et al. | 320/116 |

FOREIGN PATENT DOCUMENTS

JP   7-087673   3/1995

OTHER PUBLICATIONS

U.S. patent No. 09/443,286, Masayoshi Goto et al., "Battery Accumulating Apparatus", Nov. 19, 1999.

* cited by examiner

Primary Examiner—Gregory Toatley
(74) Attorney, Agent, or Firm—Burns, Doane, Swecker & Mathis, LLP

(57) ABSTRACT

In cell shunt circuit sections provided as overcharge protective measures for a plurality of individual cells of a lithium ion battery which are connected in series with one another so as to be charged with a constant current in a batch manner, the present invention is intended to suppress the generation of heat, which would be caused by shunting a charging current to a cell shunt. In each of the cell shunt circuit sections, an energy reservoir acts as a bypass path for bypassing a charging current supplied to a corresponding one of the battery cells so as to be input to the following battery cell, which is provided at a downstream side of the one battery cell, so as to reserve surplus energy obtained from the charging current thus bypassed and regenerate the thus reserved surplus energy to a batch charging line connected with the serially connected battery cells. A switching element is inserted in the bypass path for opening and closing thereof. The energy reservoir regenerates the surplus energy to the batch charging line when the switching element opens the by-pass path.

5 Claims, 4 Drawing Sheets

SHUNT CURRENT ($I_p$)

FEEDBACK CURRENT ($I_{bck}$)

CELL CHARGING CURRENT ($I_{cel}$)

CELL VOLTAGE ($V_c$)

SWITCHING ELEMENT (2)

CELL SHUNT CIRCUIT FOR BATTERY CELLS

This application is based on Application No. 2000-380504, filed in Japan on Dec. 14, 2000, the contents of which are hereby incorporated by reference.

BACKGROUND OF THE INVENTION

1. Field of the Invention

The present invention relates to a cell shunt (charging current shunt) circuit provided as overcharge protective measures for a plurality of individual lithium ion battery cells connected in series with one another to constitute a lithium ion battery for example, which can be installed on a satellite, spacecraft, etc.

2. Description of the Related Art

FIG. 4 illustrates a known cell shunt for a lithium ion battery cell. The known cell shunt includes a plurality of lithium ion battery cells $C_1$–$C_n$, and a plurality of cell shunt circuit sections $Sh_1$–$Sh_n$, and a battery charger 8. Each of the cell shunt circuit sections $Sh_1$–$Sh_n$ is constituted by a shunt transistor 4, a reference voltage generating section 5, and a differential amplifier 6. In addition, a symbol Ichg represents a battery charging current, $I_p$ a shunt current, $V_c$ a cell voltage, and $V_s$ a reference voltage generated by the reference voltage generating section 5.

In a nickel cadmium battery and a nickel hydrogen battery used in the past as batteries for a satellite and a spacecraft, a plurality of battery cells connected in series with one another are charged by performing batch constant-current charging in order to achieve reduction in resources of a battery charger and improvements in reliability. On the other hand, a lithium ion battery cell, which has high energy density and various excellent characteristics for installation on a satellite and a spacecraft, is becoming the mainstream of future satellite and spacecraft batteries.

In such a batch constant-current charging method, however, variations in individual capacities of the battery cells result in variations in the charging amounts for the respective cells, so that some battery cells may be overcharged.

In particular, lithium ion battery cells have a characteristic that the lifetime property is remarkably decreased due to overcharging. This is a weak point for satellite and spacecraft batteries for which a long life time is required. Thus, the cell shunt for lithium ion battery cells as referred to above is required in order to cope with such a problem.

The known cell shunt for lithium ion battery cells is constructed as shown in FIG. 4. In this known cell shunt, a battery charging current Ichg is supplied to the lithium ion battery cells $C_1$–$C_n$ connected in series with the battery charger 8 to charge the lithium ion battery cells $C_1$–$C_n$ in a batch processing manner. By this charging, charge energy is uniformly accumulated in the respective lithium ion battery cells $C_1$–$C_n$ in proportion to the product of the battery charging current Ichg and a charging current time or duration. In this process, a cell voltage $V_c$ in each of the lithium ion battery cells $C_1$–$C_n$ rises according to a charge energy limit of each cell (i.e., variations in the capacities of the cells). Although a cell having the smallest capacity first reaches a charge completion voltage, charging is continued until all the lithium ion battery cells $C_1$–$C_n$ reach the charge completion voltage.

In this charging operation, when a lithium ion battery cell $C_1$ first reaches the charge completion voltage for instance, the differential amplifier 6 in the cell shunt circuit section $Sh_1$ detects that a voltage $V_c$ across the cell $C_1$ reaches a reference voltage $V_s$ which is preset to a value equal to the charge completion voltage, and drives the shunt transistor 4, so that a surplus current (hereinafter, called a shunt current $I_p$) is shunted from the battery charging current Ichg, thus preventing the battery charging current $I_{chg}$ from being supplied to the lithium ion battery cell $C_1$. The above-mentioned operation is similarly performed in each of the cell shunt circuit sections $Sh_1$–$Sh_n$, whereby each of the lithium ion battery cells $C_1$–$C_n$ is prevented from being overcharged in the continued charging operation.

In the cell shunt circuit for lithium ion battery cells as described above, by shunting the shunt current $I_p$ from the battery charging current $I_{chg}$ through each shunt transistor 4, the lithium ion battery cells $C_1$–$C_n$ are prevented from being overcharged. However, the shunt current $I_p$ flows through each shunt transistor 4 to generate heat P therein, as expressed by the following equation (1).

$$P = I_{chg} \times V_c \tag{1}$$

This heat P makes the thermal design of the satellite and spacecraft battery system difficult. Moreover, it is a factor of disturbing the reduction in resources and the improvement in reliability of the battery charger.

SUMMARY OF THE INVENTION

The present invention is intended to solve above-mentioned drawbacks, and the object of the present invention is to suppress the generation of heat in a cell shunt circuit for battery cells.

Bearing the above object in mind, the present invention resided in a cell shunt circuit for battery cells including a plurality of shunt circuit sections connected in parallel with the battery cells, respectively, which are connected in series with one another so as to be charged in a batch manner by a battery charger, each of the cell shunt circuit sections comprising: an energy reservoir acting as a bypass path for bypassing a charging current supplied to a corresponding one of the battery cells so as to be input to the following battery cell provided at a downstream side of the one battery cell so as to reserve surplus energy obtained from the charging current thus bypassed and regenerate the thus reserved surplus energy to a batch charging line connected with the serially connected battery cells; a switching element inserted in the bypass path for opening and closing thereof; and a comparator for making a comparison between a charging voltage across the corresponding one of the battery cells and a reference voltage and outputting a driving signal to the switching element when the charging voltage is greater than the reference voltage; wherein the energy reservoir regenerates the surplus energy to the batch charging line when the switching element opens the by-pass path.

In a preferred form of the present invention, each of the shunt circuit sections further comprises a low-pass filter for detecting a charging voltage of the corresponding one of the battery cells with a response time delay and outputting a detection output to the comparator.

In another preferred form of the present invention, the battery charger comprises: a power conversion section for converting a direct current input from an exterior into a direct current; and a current control section for outputting a constant direct current to the battery cells based on an output of the power conversion section, the surplus energy being regenerated from the energy reservoir into the current control section in the same direction as that of the output from the power conversion section.

In a further preferred form of the present invention, the energy reservoir comprises a flyback transformer having a primary winding and a secondary winding which are connected in such a manner that the charging current of the battery cells is bypassed to the primary winding of the flyback transformer, and that an output of the secondary winding of the flyback transformer is regenerated to the batch charging line, with a diode being connected with the secondary winding in a direction to permit the output of the secondary winding to be supplied to the batch charging line.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings.

Embodiment 1

Figure 1:
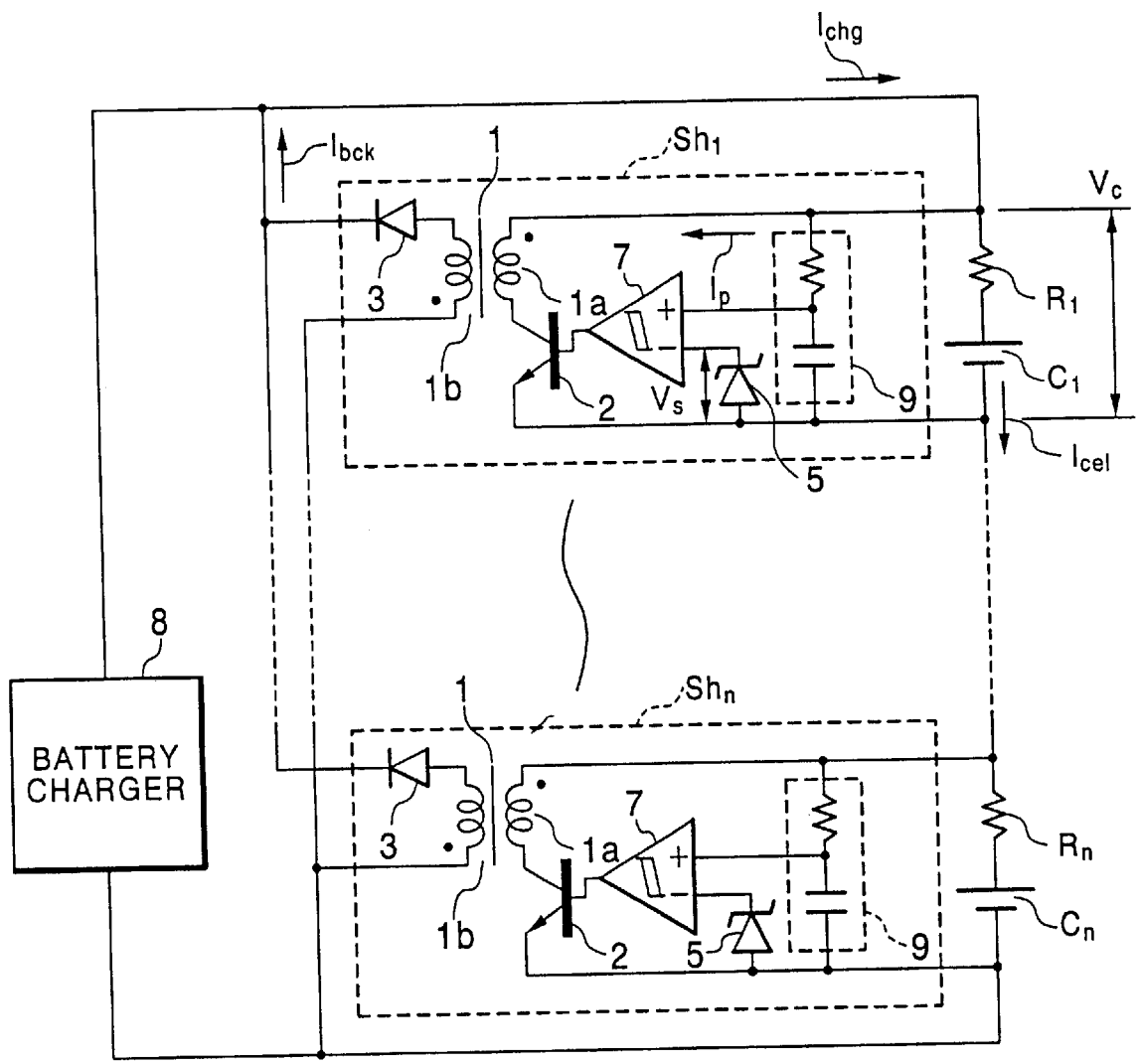
FIG. 1 is a constructional view illustrating a cell shunt for lithium ion battery cells according to a first embodiment of the present invention.

FIG. 1 is a circuit diagram showing a first embodiment of the present invention, and symbols 8 and $C_1$–$C_n$ designate quite the same components as those of the known apparatus as described above. In FIG. 1, a cell shunt circuit for battery cells according to this embodiment includes a plurality of cell shunt circuit sections $Sh_1$–$Sh_n$, each of which includes a flyback transformer 1 having a primary winding 1b and a secondary winding 1b, a switching element 2, a diode 3 connected to the secondary winding 1b of the flyback transformer 1 for regenerating the output thereof to a battery charging current $I_{chg}$, a reference voltage generating section 5, a comparator 7 having a hysteresis characteristic, and a low-pass filter 9. Symbols $R_1$–$R_n$ designate cell internal resistances of the lithium ion battery cells $C_1$–$C_n$, respectively, $I_{chg}$ a battery charging current for charging the battery cells $C_1$–$C_n$, $I_p$ a shunt current in each of the cell shunt circuit sections $Sh_1$–$Sh_n$, $I_{cell}$ a cell charging current actually flowing through each of the lithium ion battery cells $C_1$–$C_n$, $I_{bck}$ a feedback current regenerated from the secondary winding 1b of each flyback transformer 1 to the battery charging current $I_{chg}$, $V_c$ a cell voltage or a voltage across each battery cell, and $V_s$ a reference voltage generated by each reference voltage generating section 5.

In the cell shunt circuit for lithium ion battery cells constructed above, reference will hereinbelow be made to the case where the cell voltage $V_c$ of a lithium ion battery cell $C_1$ first reaches a charge completion voltage for instance.

The comparator 7 in the cell shunt circuit section $Sh_1$ compares a cell voltage $V_c$ of the lithium ion battery cell $C_1$ with a first hysteresis level $V_{sp}$ of the reference voltage $V_s$ which is preset to a value corresponding to the charge completion voltage of the lithium ion battery cell $C_1$. When it is detected that the cell voltage $V_c$ is greater than the hysteresis level $V_{sp}$, the comparator 7 outputs a drive signal for driving the corresponding switching element 2. Thus, the switching element 2 is turned on based on the drive signal.

As a result, a by-pass path to the lithium ion battery cell $C_1$, which has been opened by the corresponding switching element 2 up to now, is closed, so that a shunt current $I_p$ is shunted from the battery charging current $I_{chg}$ to the primary winding 1a of the corresponding flyback transformer 1.

Here, in the flyback transformer 1 acting as an energy reservoir, the shunt current $I_p$ flows in the primary winding 1a, thereby suppressing the inflow of the battery charging current $I_{chg}$ into the lithium ion battery cell $C_1$. At this time, the electric energy obtained from the shunt current $I_p$ (hereinafter, referred to as surplus energy) is reserved in the flyback transformer 1.

In addition, when the switching element 2 is in an on state in this manner, the output of the secondary winding 1b of the flyback transformer 1 is connected with the diode 3 in a manner as to be placed in a cut-off state.

This shunt current $I_p$ is expressed by the following equation (2):

$$I_p = V_c \times t / L_p \qquad (2)$$

where $L_p$ represents the inductance of the primary winding 1a of the flyback transformer 1; and t represents the time elapsed.

Subsequently, the shunt current $I_p$ continues to rise as long as the switching element 2 is being driven into an on state, as indicated by equation (2) above, so that the cell charging current $I_{cel}$ flowing in the lithium ion battery cell $C_1$ becomes equal to the battery charging current $I_{chg}$ subtracted by the shunt current $I_p$, thus continuing to decrease. As a result, a voltage drop across the cell internal resistance $R_1$ caused by the product thereof with the cell charging current $I_{cel}$ decreases, and hence the cell voltage $V_c$ also decreases. Consequently, the comparator 7 in the cell shunt circuit section $Sh_1$ detects when the cell voltage $V_c$ falls below a second hysteresis level $V_{ss}$ of the reference voltage $V_s$, and stops generating the drive signal to the switching element 2, as a result of which the switching element 2 is driven into an off state.

The second hysteresis level $V_{ss}$ of the reference voltage $V_s$ is set to be lower than the first hysteresis level $V_{sp}$. By providing a difference between these hysteresis levels, it is possible to prevent the on/off operation of the switching element 2 from being made unstable to oscillate due to fine variations in the cell voltage $V_c$.

Next, reference will be made to the case where the switching element 2 is switched over from a closed state into an open state.

First of all, the diode 3 is connected with the secondary winding 1b of the flyback transformer 1 in such a manner that it is in a cutoff state as long as the switching element 2 is in the closed state. Also, the diode 3 is connected with the batch charging line so as to regenerate the output of the secondary winding 1b to the batch charging line.

Here, at the instant when the switching element 2 is switched over from the closed state into the open state, the flyback transformer 1 regenerates the surplus energy reserved in the above manner to the batch charging line as a feedback current $I_{bck}$.

In this connection, note that a duration $t_{off}$ in which the feedback current $I_{bck}$ is flowing is expressed by the following equation (3).

$$t_{off}=(V_c \times t_{on}/L_p) \times (N_p \times L_s/N_s)/V_{bat} \quad (3)$$

wherein $V_c$ represents the cell voltage of the lithium ion battery cell $C_1$; $t_{on}$ represents the closing time of the switching element 2; $L_s$ represents the inductance of the secondary winding 1b of the flyback transformer 1; $N_p$ represents the number of turns of the primary winding 1a of the flyback transformer 1; $N_s$ represents the number of turns of the secondary winding 1b of the flyback transformer 1; and $V_{bat}$ represents a total sum of the cell voltages of the lithium ion battery cells $C_1$–$C_n$.

The product It of the charging time and the charging current, which is charged to the lithium ion battery cell $C_1$ in the state where the on/off operation of the switching element 2 is repeated as described above, is expressed by the following equation (4).

$$It=(I_{chg}-(V_c \times t_{on}^2)/(2 \times L_p \times t_c) \times t \quad (4)$$

where $t_c$ represents a switching cycle.

Figure 2A:
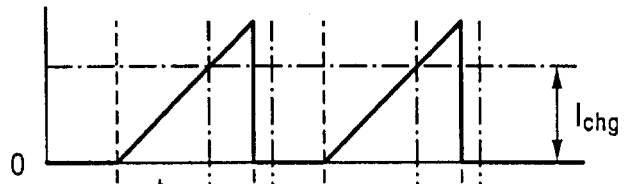
FIGS. 2A through 2E are time charts illustrating operating states of respective portions of the cell shunt for lithium ion battery cells according to the first embodiment of the present invention.
Figure 2B:
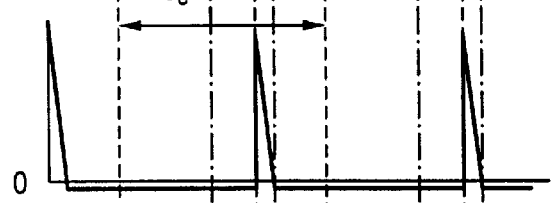
Figure 2C:
Figure 2D:
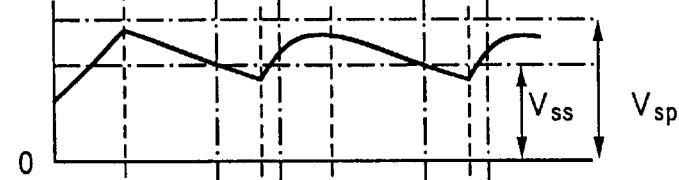
Figure 2E:
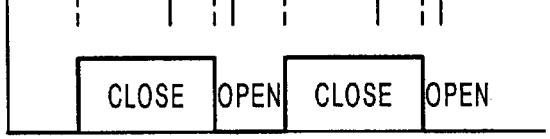

FIG. 2(a) illustrates the operation over time of the shunt current $I_p$ used in the above-mentioned equations (2) through (4); FIG. 2(b) illustrates the operation over time of the feedback current $I_{bck}$ used in the above-mentioned equations (2) through (4); FIG. 2(C) illustrates the operation over time of the cell charging current $I_{cel}$ used in the above-mentioned equations (2) through (4); FIG. 2(d) illustrates the operation over time of the cell voltage $V_c$ used in the above-mentioned equations (2) through (4); and FIG. 2(e) illustrates the opening and closing timing operation over time of the switching element used in the above-mentioned equations (2) through (4).

As described above, the product It of the charging current and the charging time as shown in equation (4) above is made zero as a result of the on/off operation of the switching element 2, whereby the lithium ion battery cell $C_1$ can be prevented from being overcharged.

In addition, the flyback transformer 1 serves to regenerate the surplus energy supplied by the battery charger 8 to the batch charging line, thereby suppressing excessive heating in the cell shunt circuit section $Sh_1$.

Further, in FIG. 2, the feedback current $I_{bck}$ is superposed on the cell charging current $I_{cel}$ during the time $t_{off}$ the feedback current $I_{bck}$ is flowing, so that a voltage drop across the cell internal resistance $R_1$ caused by the product thereof with the cell charging current $I_{cel}$ thus superposed by the feedback current increases. As a result, the comparator 7 might drive to turn on the switching element 2 during the time when the feedback current $I_{bck}$ is flowing.

Thus, in this cell shunt circuit section $Sh_1$, by providing the low-pass filter 9 at an input terminal of the comparator 7 which detects the cell voltage $V_c$, the low-pass filter 9 delays the detection response time for the cell voltage $V_c$, and outputs the detection result to the comparator 7, as a consequence of which the comparator 7 can be prevented from turning on the switching element 2 during the time the feedback current $I_{bck}$ is flowing.

The above-mentioned operation is similarly carried out in the remaining lithium ion battery cells $C_2$–$C_n$, so that the respective lithium ion battery cells $C_2$–$C_n$ can be prevented from being overcharged in the continued charging operation.

Embodiment 2.

Figure 3:
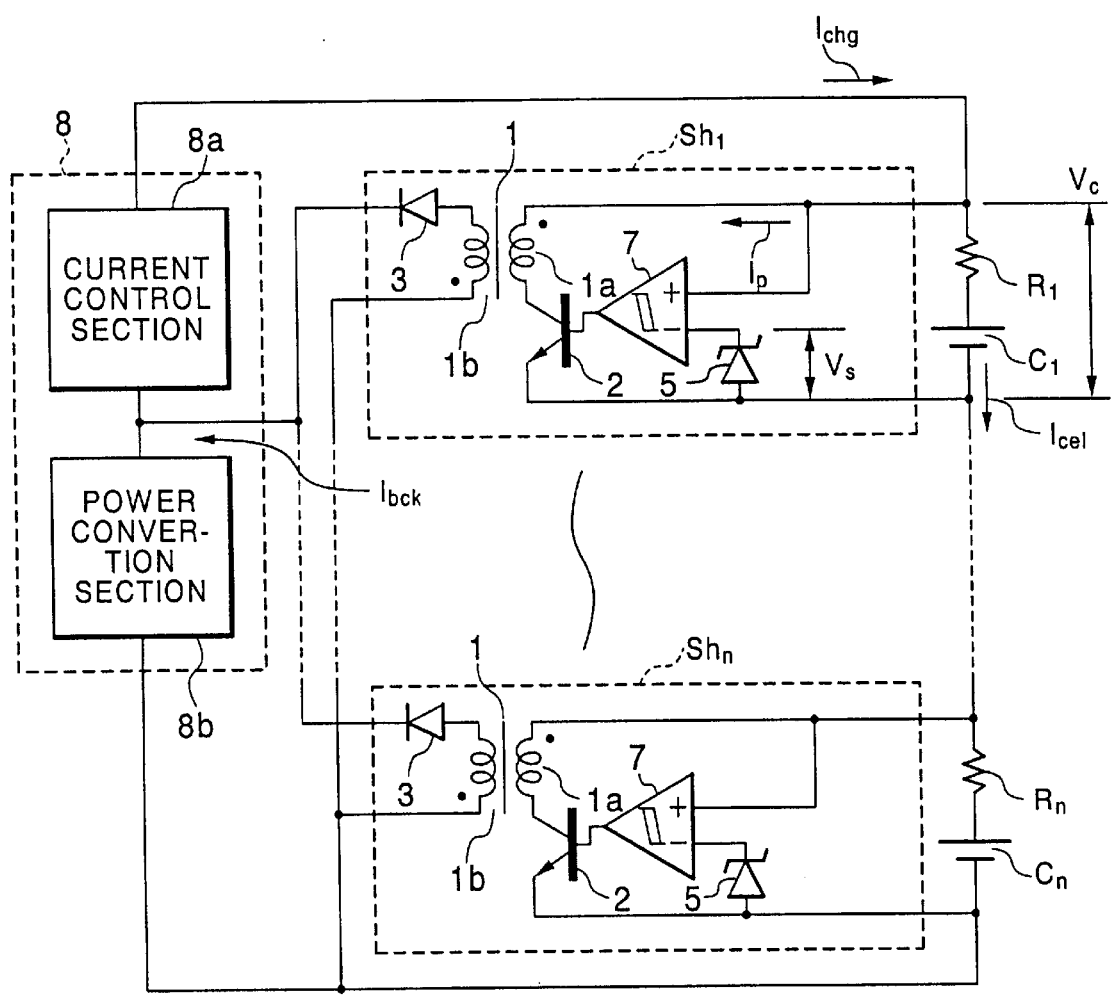
FIG. 3 is a constructional view illustrating a cell shunt for lithium ion battery cells according to a second embodiment of the present invention.
Figure 4:
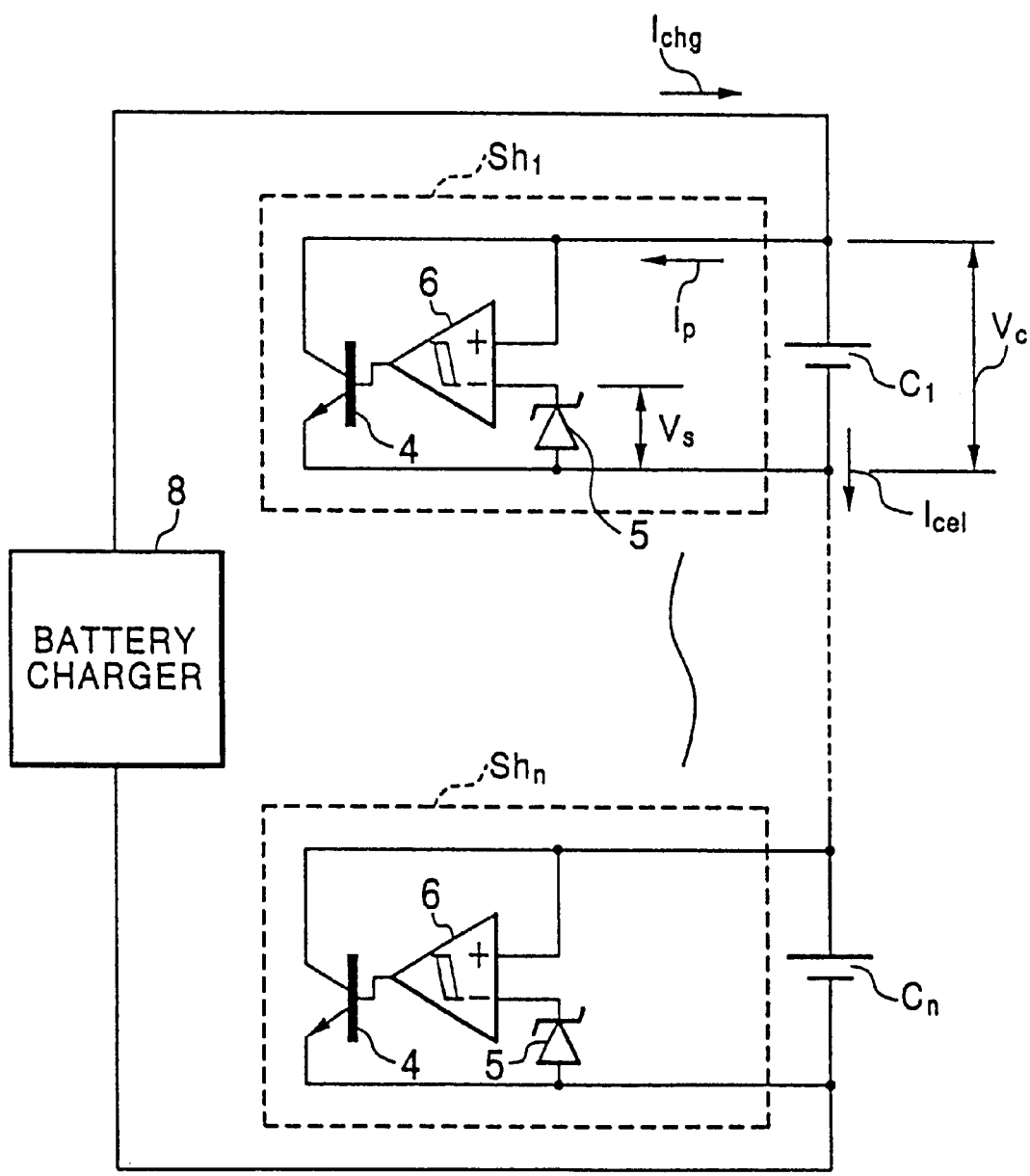
FIG. 4 is a constructional view illustrating a known cell shunt for lithium ion battery cells.

FIG. 3 is a circuit diagram illustrating a second embodiment of the present invention. In FIG. 3, symbols 1, 1a, 1b, 2, 3, 4, 7, 8, $C_{1-Cn}$, $Sh_1$–$Sh_n$, $R_1$–$R_n$, $I_{chg}$, $I_p$, $I_{cel}$, $I_{bck}$, $V_c$, and $V_s$ represent quite the same as in the known apparatus. The battery charger 8 of this embodiment has a current control section 8a and a power conversion section 8b.

The power conversion section 8b converts an alternating current input from the exterior into a corresponding direct current, and the current control section 8a controls the direct current output from the power conversion section 8b so as to output a constant direct current.

In the cell shunt for lithium ion battery cells constructed in the above manner, the output from the secondary winding 1b of each flyback transformer 1 is connected so as to be regenerated between the current control section 8a and the power conversion section 8b of the battery charger 8.

The current control section 8a is always controlled to output a constant current so that a constant battery charging current $I_{chg}$ can be output to the lithium ion battery cells $C_1$–$C_n$ at all times regardless of whether there is any feedback current $I_{bck}$ supplied to the current control section 8a from the secondary winding 1b of each flyback transformer 1.

That is, in the cell shunt for lithium ion battery cells of this embodiment, the feedback current $I_{bck}$ is never superposed on the battery charging current $I_{chg}$ as in the first embodiment. Consequently, the feedback current $I_{bck}$ is not superposed on the cell charging current $I_{cel}$. Thus, the low-pass filter 9 employed in the first embodiment for removing such a superposition of the feedback current by delaying a time change becomes unnecessary.

As described in the foregoing, according to the present invention, in cell shunt circuit sections provided as overcharge protective measures for individual battery cells, by regenerating surplus energy, which is generated by the product of a cell voltage and a shunt current and which becomes a heat source, to a battery charging current as a feedback current via a flyback transformer, it is possible to prevent the surplus energy from being consumed as heat for heating the cell shunt circuit sections.

In addition, by delaying a detection voltage response time of a comparator by means of a low-pass filter, it is also possible to prevent a switching element from being unnecessarily driven to operate.

Moreover, by providing the surplus energy regenerated from a secondary winding of each flyback transformer to a current control section of a battery charger, it is possible to input a constant charging current to each battery cell at any time.

While the invention has been described in terms of preferred embodiments, those skilled in the art will recognize that the invention can be practiced with modifications within the spirit and scope of the appended claims.

What is claimed is:

1. A cell shunt circuit for battery cells including a plurality of shunt circuit sections connected in parallel with the battery cells, respectively, which are connected in series with one another so as to be charged in a batch manner by a battery charger, each of said cell shunt circuit sections comprising:

an energy reservoir acting as a bypass path for bypassing a charging current supplied to a corresponding one of said battery cells so as to be input to the following battery cell provided at a downstream side of said one battery cell so as to reserve surplus energy obtained from the charging current thus bypassed and regenerate the thus reserved surplus energy to a batch charging line connected with said serially connected battery cells;

a switching element inserted in said bypass path for opening and closing thereof; and a comparator for making a comparison between a charging voltage across the corresponding one of said battery cells and a reference voltage and outputting a driving signal to said switching element when the charging voltage is greater than the reference voltage; wherein said energy reservoir regenerates said surplus energy to said batch charging line when said switching element opens said by-pass path.

2. The cell shunt circuit for battery cells according to claim 1, wherein each of said shunt circuit sections further comprises a low-pass filter for detecting a charging voltage of the corresponding one of said battery cells with a response time delay and outputting a detection output to said comparator.

3. The cell shunt circuit for battery cells according to claim 1, wherein said battery charger comprises:

a power conversion section for converting a direct current input from an exterior into a direct current; and a current control section for outputting a constant direct current to said battery cells based on an output of said power conversion section, said surplus energy being regenerated from said energy reservoir into said current control section in the same direction as that of the output from said power conversion section.

4. The cell shunt circuit for battery cells according to claim 2, wherein said energy reservoir comprises a flyback transformer having a primary winding and a secondary winding which are connected in such a manner that the charging current of said battery cells is bypassed to said primary winding of said flyback transformer, and that an output of said secondary winding of said flyback transformer is regenerated to said batch charging line, with a diode being connected with said secondary winding in a direction to permit the output of said secondary winding to be supplied to said batch charging line.

5. The cell shunt circuit for battery cells according to claim 3, wherein said energy reservoir comprises a flyback transformer having a primary winding and a secondary winding which are connected in such a manner that the charging current of said battery cells is bypassed to said primary winding of said flyback transformer, and that an output of said secondary winding of said flyback transformer is regenerated to said batch charging line, with a diode being connected with said secondary winding in a direction to permit the output of said secondary winding to be supplied to said batch charging line.

* * * * *